United States Patent
Li

(10) Patent No.: US 9,021,904 B2
(45) Date of Patent: May 5, 2015

(54) AXIAL ADJUSTMENT DEVICE

(71) Applicant: Gison Machinery Co., Ltd., Taichung (TW)

(72) Inventor: Kuang-Tai Li, Taichung (TW)

(73) Assignee: Gison Machinery Co., Ltd., Taichung (TW)

( * ) Notice: Subject to any disclaimer, the term of this patent is extended or adjusted under 35 U.S.C. 154(b) by 253 days.

(21) Appl. No.: 13/692,330

(22) Filed: Dec. 3, 2012

(65) Prior Publication Data

US 2014/0150579 A1 Jun. 5, 2014

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/02* | (2006.01) |
| *F16H 25/20* | (2006.01) |
| *F16H 35/16* | (2006.01) |

(52) U.S. Cl.
CPC ........... *F16H 25/02* (2013.01); *Y10T 74/18624* (2015.01); *F16H 25/20* (2013.01); *F16H 35/16* (2013.01)

(58) Field of Classification Search
USPC ............ 74/89.23, 89.32, 89.33, 89.27, 89.28, 74/89.29, 89.38, 89.39, 89.2, 405, 406; 116/200, 230, 281
See application file for complete search history.

(56) References Cited

U.S. PATENT DOCUMENTS

| | | | | |
|---|---|---|---|---|
| 1,797,809 | A | * | 3/1931 | Turrettini ........................ 82/137 |
| 2,195,400 | A | * | 4/1940 | Arens .......................... 74/501.6 |
| 3,554,046 | A | * | 1/1971 | Kirk ............................. 74/89.32 |
| 3,572,140 | A | * | 3/1971 | Gulick ......................... 74/89.27 |
| 4,567,927 | A | | 2/1986 | Plamann |
| 5,732,592 | A | * | 3/1998 | Parker ............................... 74/89 |

* cited by examiner

*Primary Examiner* — Justin Krause
(74) *Attorney, Agent, or Firm* — Guice Patents PLLC

(57) ABSTRACT

An axial adjustment device includes: a main body; two slide seats disposed in the main body; a first and a second threaded rods disposed in the main body and respectively screwed in the two slide seats; a first transmission gear connected with the first threaded rod; a second transmission gear connected with the second threaded rod; and a fastening member. When the fastening member is switched to a fastening position, the two threaded rods are driven with each other via the two transmission gears. When the fastening member is switched to a releasing position, the two threaded rods can be only independently rotated. The axial adjustment device can control the two slide seats to independently or synchronously move.

20 Claims, 17 Drawing Sheets

AXIAL ADJUSTMENT DEVICE

BACKGROUND OF THE INVENTION

1. Field of the Invention

The present invention relates generally to an axial adjustment device for driving an object to move.

2. Description of the Related Art

A conventional mechanical apparatus often includes an axial adjustment device for axially moving an object. For example, U.S. Pat. No. 4,567,927 discloses an apparatus for automatically forming ovals. The apparatus includes a trammel beam 56 composed of an upper beam 56a and a lower beam 56b. A tool-holding bracket 84 is mounted on the lower beam 56b, a cutting tool 92 is mounted on the tool-holding bracket 84. A threaded rod 108 is screwed with the tool-holding bracket 84. When the threaded rod 108 is rotated, the tool-holding bracket 84 is driven to slide along the lower beam 56a. Accordingly, the positions of the tool-holding bracket 84 and the cutting tool 92 can be adjusted.

The existent axial adjustment device is simply able to control the axial displacement of one single object. There is no axial adjustment device capable of controlling two objects to move in the same axial direction.

SUMMARY OF THE INVENTION

It is therefore a primary object of the present invention to provide an axial adjustment device, which is able to control two objects to move in the same axial direction.

It is a further object of the present invention to provide an axial adjustment device, which can control two objects to independently move or synchronously move.

The axial adjustment device of the present invention includes: a main body having a front end piece; a first slide seat and a second slide seat positioned in the main body; a first threaded rod and a second threaded rod disposed in the main body, each of the two threaded rods having a front end provided with a rod section, the rod sections extending through the front end piece and out of the front end piece; a body of the first threaded rod being screwed in the first slide seat; a body of the second threaded rod being screwed in the second slide seat; a first rotary button and a second rotary button respectively disposed at front ends of the rod sections of the two threaded rods; a first transmission gear and a second transmission gear, the second transmission gear being fixedly disposed on the rod section of the second threaded rod, the first transmission gear being disposed on the first threaded rod; and a fastening member operable between a fastening position and a releasing position. When the fastening member is positioned in the fastening position, the two threaded rods are driven with each other via the transmission gears.

When the fastening member is switched to the fastening position, the axial adjustment device is in a synchronous operation mode in which when rotating any threaded rod, the other threaded rod is driven and rotated via the two transmission gears so that the two slide seats are synchronously driven to slide. When the fastening member is switched to the releasing position, the adjustment device is switched to an independent operation mode in which the two threaded rods can be only independently rotated. Therefore, the axial adjustment device can control the two slide seats to independently or synchronously move.

Preferably, the axial adjustment device further includes a lock mechanism disposed in the front end piece. The lock mechanism serves to lock the two threaded rods so as to locate the two slide seats.

The present invention can be best understood through the following description and accompanying drawings, wherein:

DETAILED DESCRIPTION OF THE PREFERRED EMBODIMENTS

Figure 1:
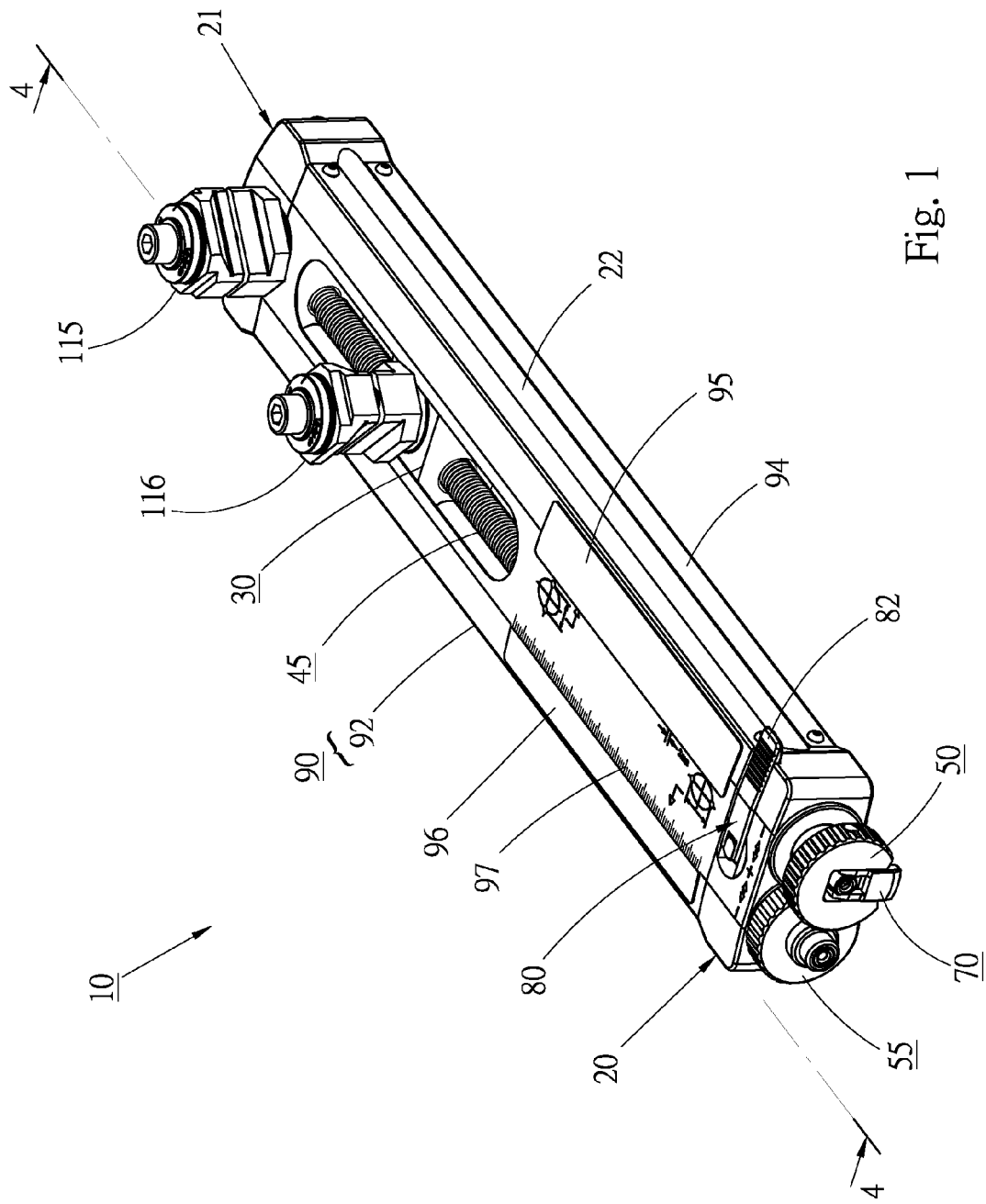
FIG. 1 is a perspective assembled view of a first embodiment of the present invention.
Figure 2:
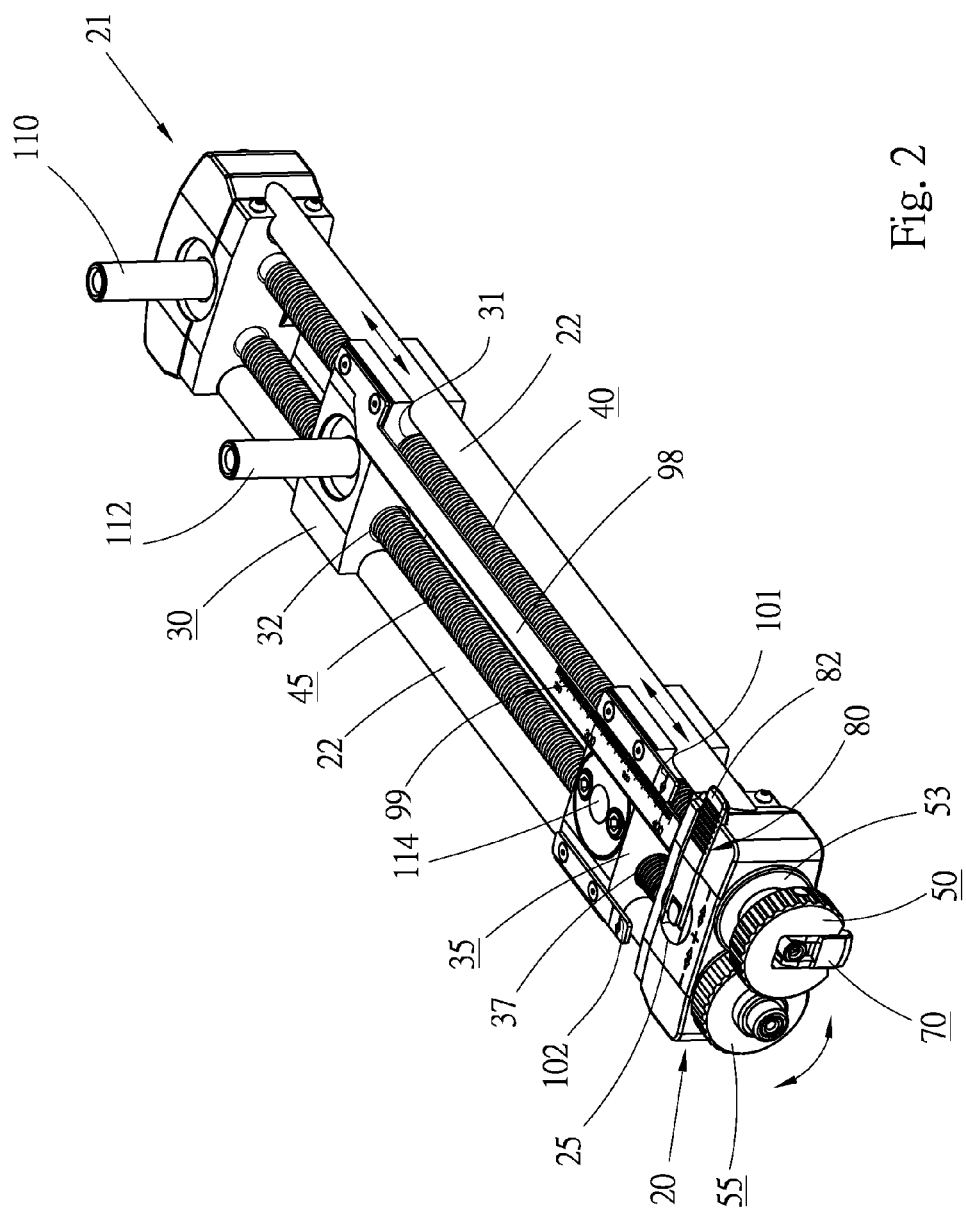
FIG. 2 is a perspective assembled view of the main structure of the first embodiment of the present invention, in which the housing is removed.
Figure 3:
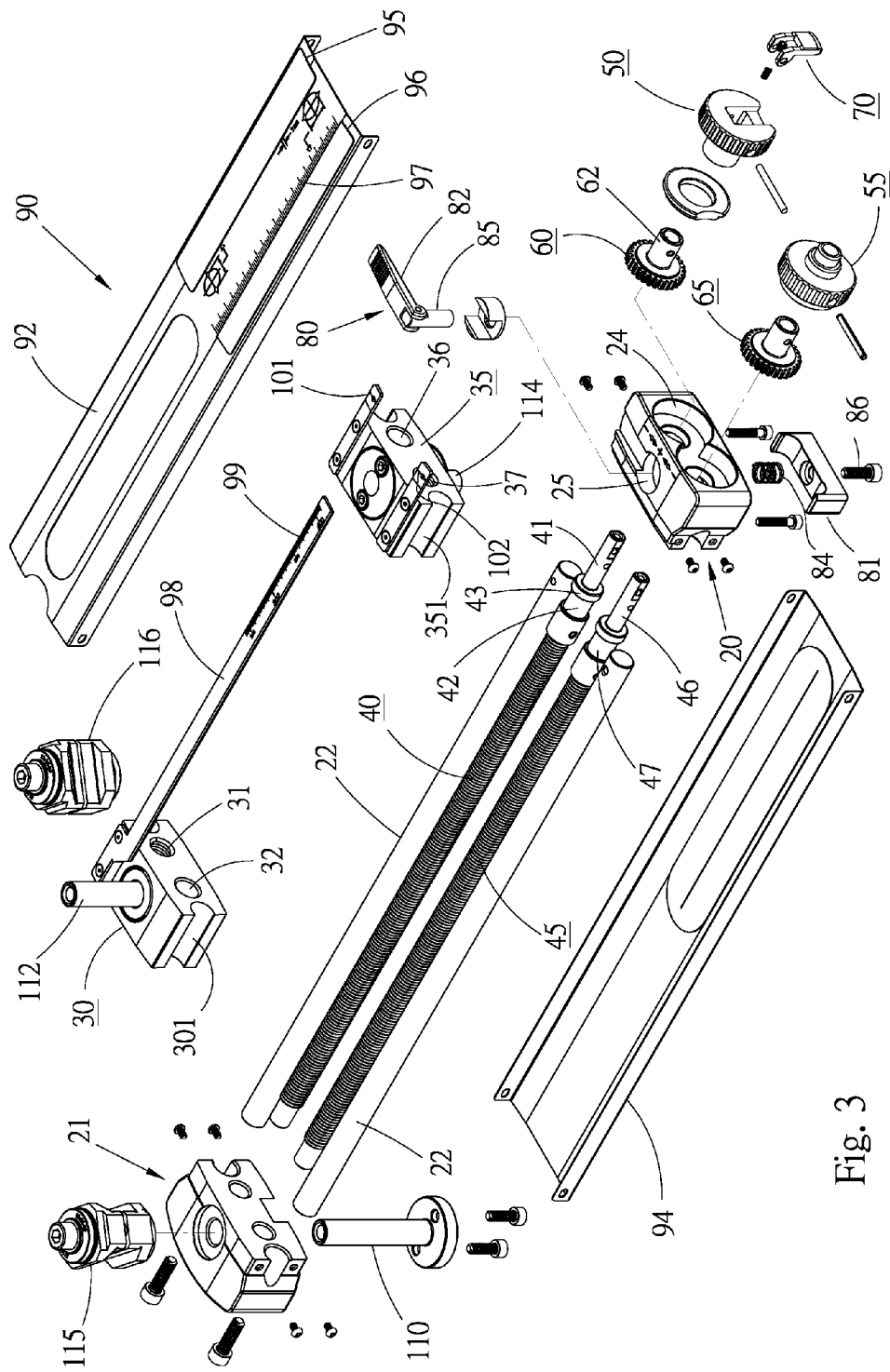
FIG. 3 is a perspective exploded view of the first embodiment of the present invention.
Figure 4:
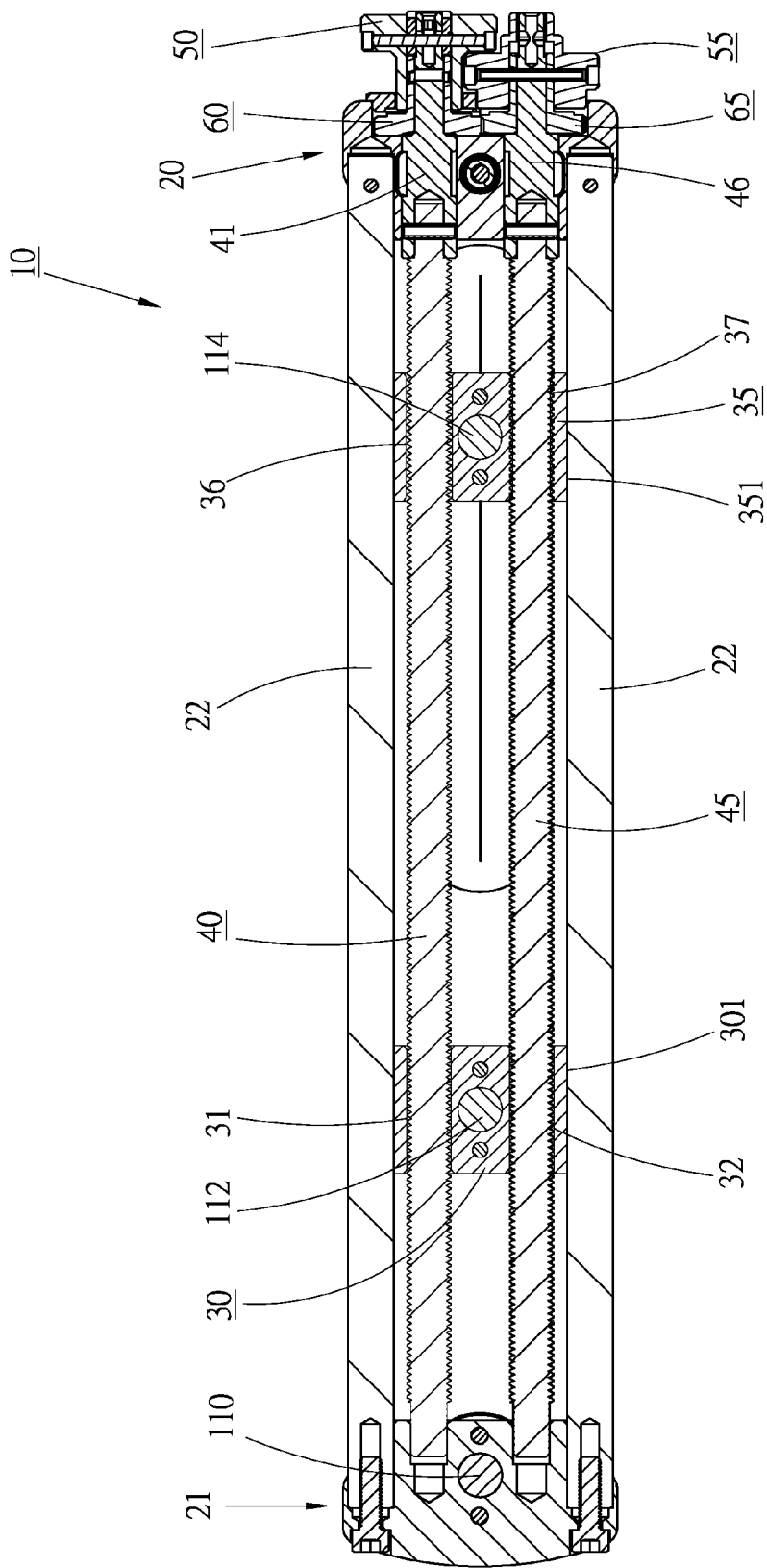
FIG. 4 is a sectional view taken along line 4-4 of FIG. 1.

Please refer to FIGS. 1 to 4. According to a first embodiment, the axial adjustment device 10 of the present invention includes a main body, two guide rails 22, a first slide seat 30, a second slide seat 35, a first threaded rod 40, a second threaded rod 45, two rotary buttons 50, 55, two transmission gears 60, 65, a fastening member 70 and a lock mechanism 80.

The main body is composed of a front end piece 20 and a rear end piece 21, which are spaced from each other.

Two ends of the two guide rails 22 are respectively fixedly connected with the two end pieces 20, 21 in parallel to each other.

The two slide seats 30, 35 are forward and backward arranged and positioned between the two end pieces 20, 21. The slide seats 30, 35 are formed with channels 301, 351 on two sides. The two guide rails 22 are fitted in the channels 301, 351, permitting the slide seats 30, 35 to axially slide along the guide rails. In this embodiment, the first slide seat 30 is a rear slide seat, while the second slide seat 35 is a front slide seat. One side of the rear slide seat 30 is formed with a threaded hole 31, while the other side of the rear slide seat 30 is formed with a through hole 32. One side of the front slide seat 35 is formed with a through hole 36, while the other side of the front slide seat 35 is formed with a threaded hole 37. The two threaded holes 31, 37 are positioned on different sides.

The two threaded rods 40, 45 are rotatably disposed between the two end pieces 20, 21 in parallel to each other. The two threaded rods 40, 45 have threads in the same direction or in reverse directions. In this embodiment, the two threaded rods have threads in the same direction. Each threaded rod has a front end provided with a rod section 41, 46. The rod section and the threaded rod are integrally formed. Alternatively, the rod section can be a separate part fixedly connected with the front end of the threaded rod. The circumference of each rod section 41, 46 is formed with an annular groove 42, 47. The body of the first threaded rod 40 is further formed with an annular shoulder section 43 in front of the annular groove 42. The body of the first threaded rod 40 is passed through the through hole 36 of the front slide seat 35 and screwed in the threaded hole 31 of the rear slide seat 30. The body of the second threaded rod 45 is screwed in the threaded hole 37 of the front slide seat 35 and passed through the through hole 32 of the rear slide seat 30. Accordingly, the first threaded rod 40 can drive the rear slide seat 30 to move, while the second threaded rod 45 can drive the front slide seat 35 to move.

In this embodiment, the guide rails 22 also serve as two supports interconnected between the two end pieces. However, in practice, the two end pieces 20, 21 can be further fixedly connected by means of other rod members. In this case, only one guide rail is needed to be mounted between the two end pieces, the guide rail passes through the two slide seat, whereby the two slide seats 30, 35 can also axially slide along the guide rail. Alternatively, the two threaded rods can also serve as two guide rails. In this case, it is unnecessary to additionally mount any other guide rail between the two end pieces.

Figure 5:
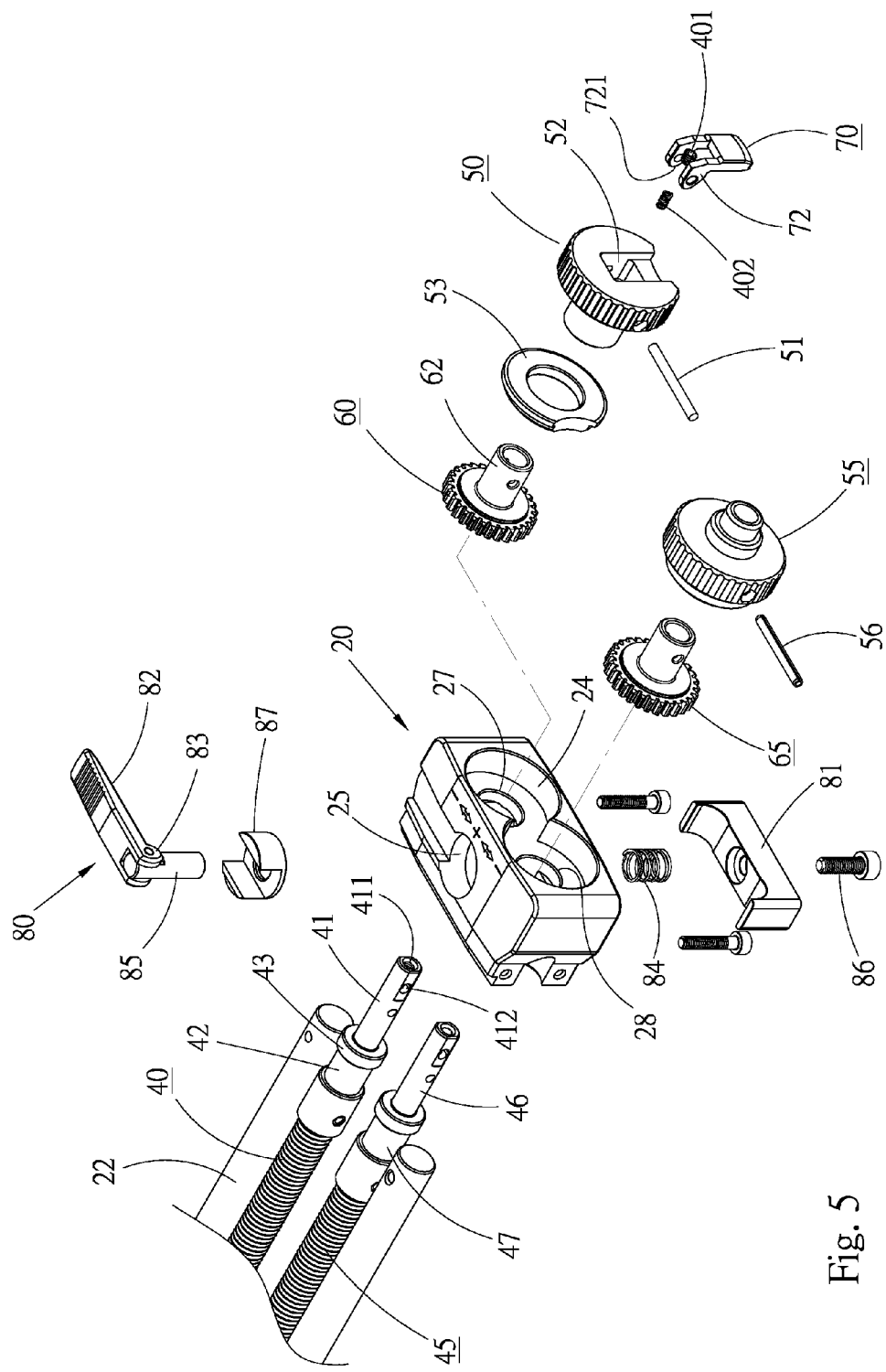
FIG. 5 is a perspective exploded view of a part of the first embodiment of the present invention.
Figure 6:
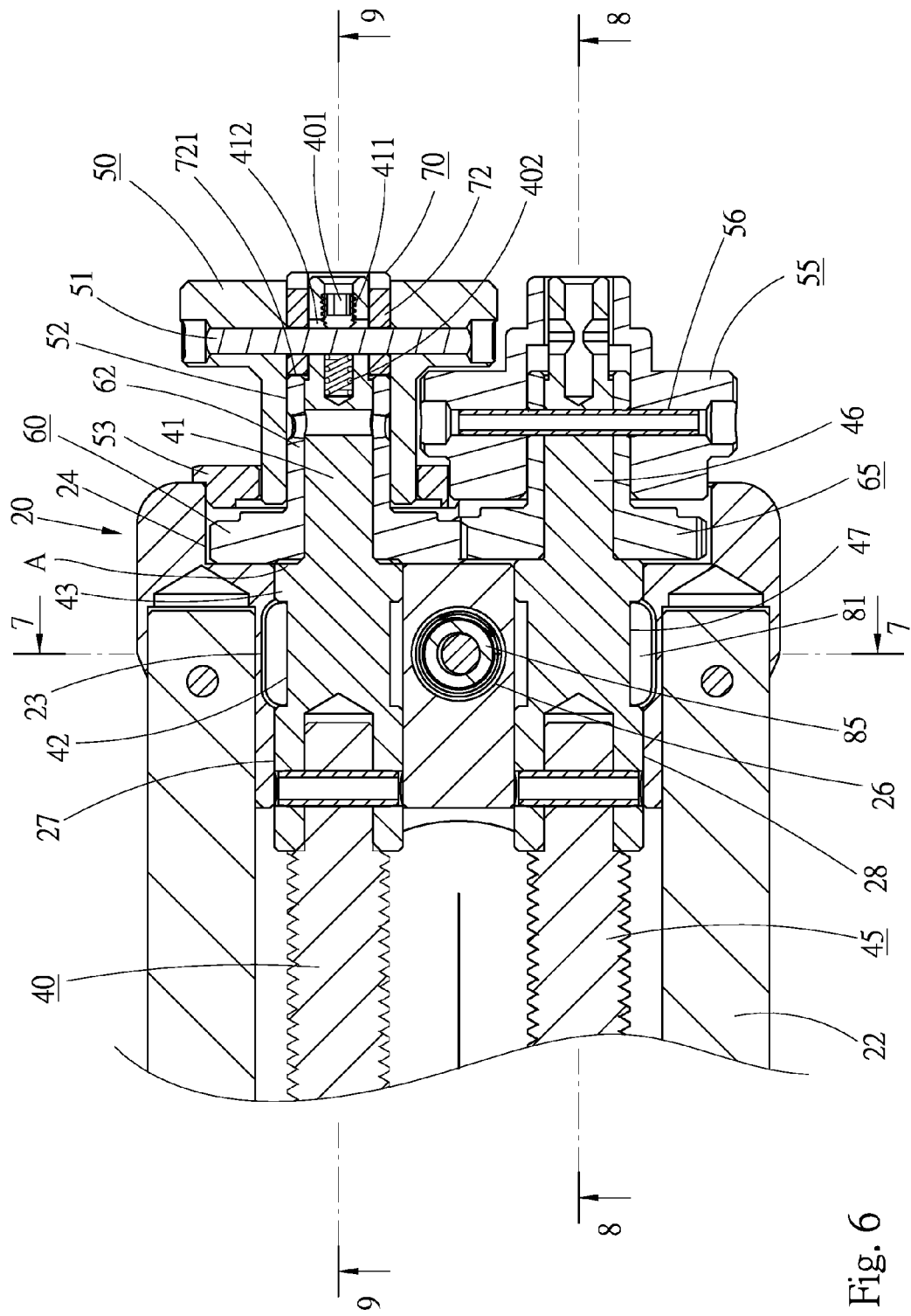
FIG. 6 is an enlarged view of a part of FIG. 4.
Figure 7:
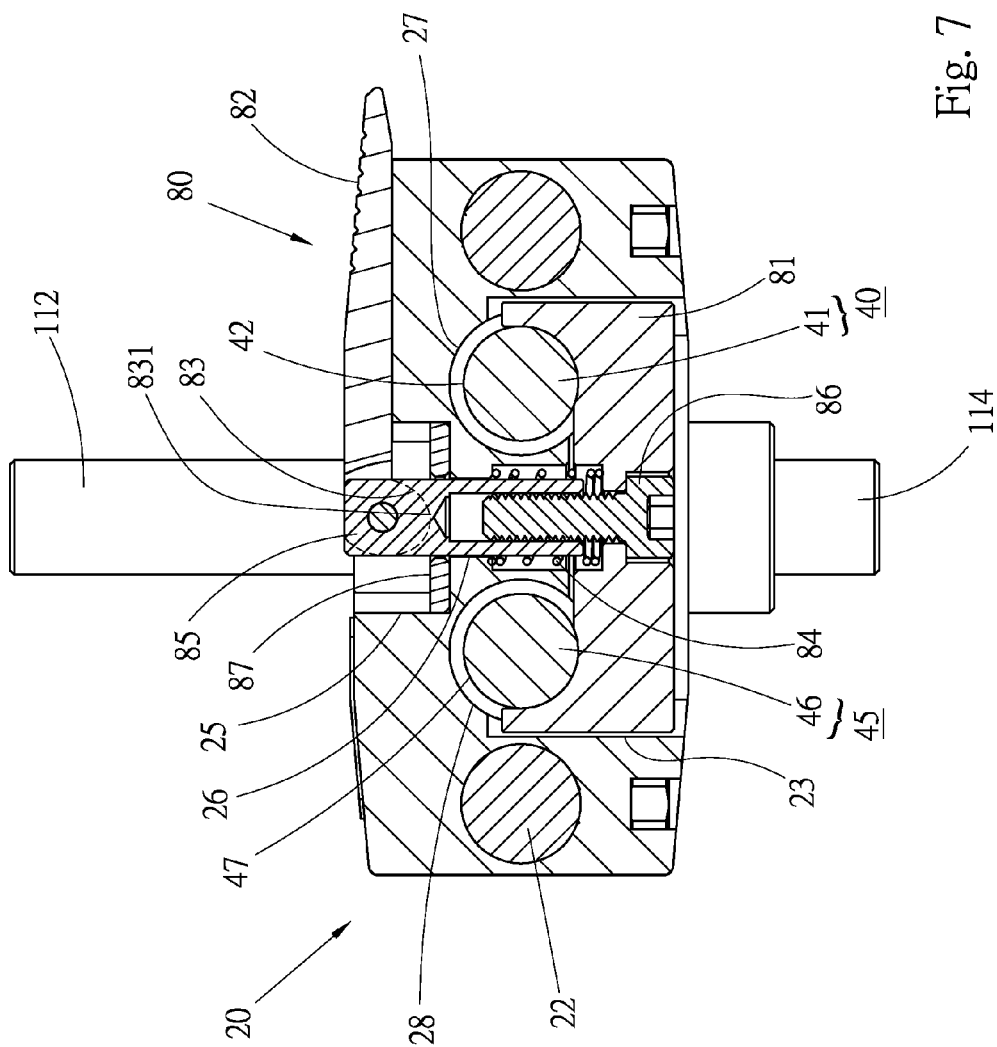
FIG. 7 is a sectional view taken along line 7-7 of FIG. 6, showing that the lock mechanism is in a locking state.

Please now refer to FIGS. 5 to 7. The bottom face of the front end piece 20 is formed with a recess 23. The front end face of the front end piece 20 is formed with a chamber 24. A cavity 25 is formed on the top face of the front end piece in communication with the recess 23 via a connection hole 26. Two installation holes 27, 28 pass through the front end piece 20 between the front and rear end faces thereof. The installation holes 27, 28 communicate with the recess 23 and the chamber 24. The front ends of the two threaded rods 40, 45 are respectively installed in the two installation holes 27, 28, the front ends of the rod sections 41, 46 extend out of the front end face of the front end piece 20. The annular grooves 42, 47 of the two rod sections are positioned in the recess 23.

Figure 10:
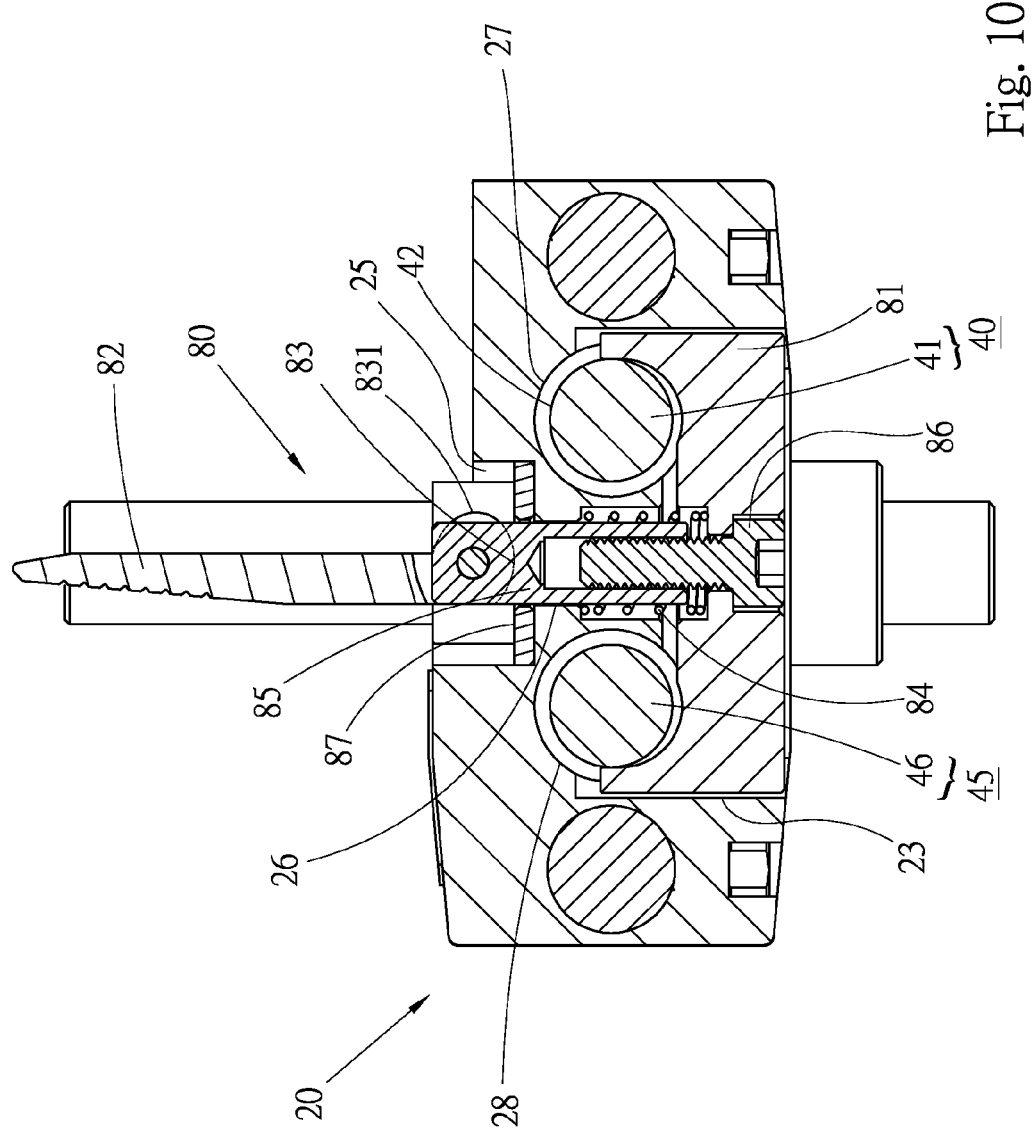
FIG. 10 is a sectional view according to FIG. 7, showing that the lock mechanism is in an unlocking state.
Figure 12:
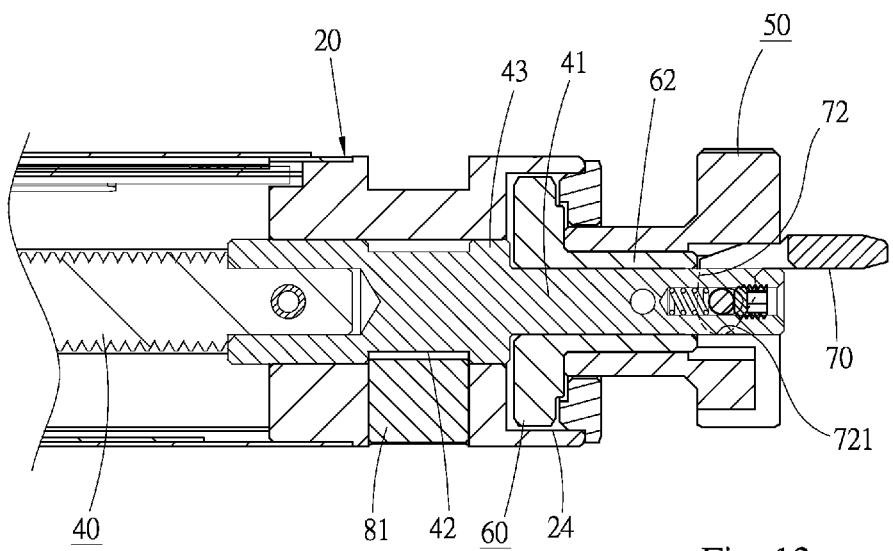
FIG. 12 is a sectional view taken along line 12-12 of FIG. 11.

The lock mechanism 80 is installed on the front end piece 20 and includes a holding block 81, a lever 82, an elastic member 84 and a link 85. The holding block 81 is positioned in the recess 23 as shown in FIG. 7 and is slidable within the recess 23. The link 85 is passed through the connection hole 26. A bottom end of the link 85 is connected with the holding block 81 by means of a threaded member. One end of the lever 82 is a cam end 83 pivotally connected with a top end of the link 85 and positioned in the cavity 25. A pad 87 is disposed between the cam end 83 and a bottom wall of the cavity 25. When levering the lever 82, via the link 85, the holding block 81 is driven to slide up and down. The elastic member 84 is fitted around the link 85, two ends of the elastic member 84 respectively abut against the front end piece 20 and the holding block 81. The elastic member 84 serves to apply an elastic force to the holding block for making the holding block slide downward. In this embodiment, a top end of the holding block 81 is in the annular grooves 42, 47 of the threaded rods 40, 45, when the holding block 81 is positioned in a lower dead end as shown in FIGS. 10 and 12, the top end of the holding block is not moved out of the two annular grooves 42, 47. Under such circumstance, the two threaded rods 40, 45 are restricted by the holding block from sliding back and forth. In the case that the threaded rods are located in another manner, it is unnecessary to form the annular grooves on the threaded rods.

The two rotary buttons 50, 55 and the two transmission gears 60, 65 are respectively fitted on the front ends of the two threaded rods 40, 45. The two gears 60, 65 are mounted in the chamber 24 of the front end piece 20 and engaged with each other as shown in FIG. 6. The two rotary buttons 50, 55 are positioned in front of the two gears and exposed to outer side of the front end piece for a user to operate. The second gear 65 and the second rotary button 55 are fixedly connected with the rod section 46 of the second threaded rod 45 by means of an insertion pin 56. Accordingly, the three components 55, 65, 45 can be synchronously rotated. The first rotary button 50 is fixedly connected with the rod section 41 of the first threaded rod 40 by means of an insertion pin 51. Therefore, the two components 50, 40 can be synchronously rotated. The rotary button 50 is formed with an internal passage 52. The first gear 60 is fitted on the rod section 41 of the first threaded rod 40. The first gear 60 can slide and idle on the rod section 41 of the first threaded rod 40. In a specific state, the first gear 60 can be rotated along with the first threaded rod 40. This will be described hereinafter. The gear 60 has a hub section 62 protruding from a front end of the gear 60, the hub section 62 extends into the passage 52 of the first rotary button 50. A sealing cap 53 blocks the opening of the chamber 24 to provide a dustproof effect.

Figure 9:
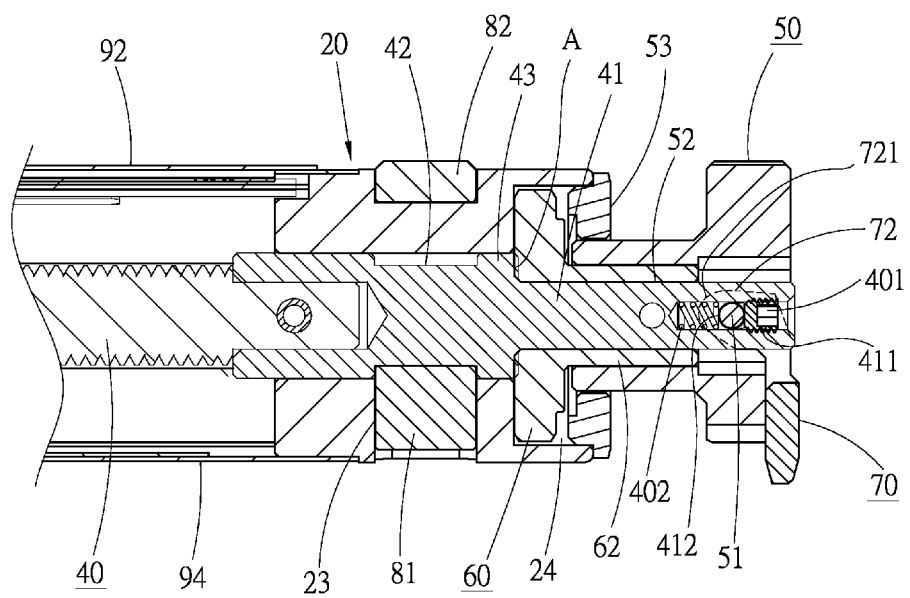
FIG. 9 is a sectional view taken along line 9-9 of FIG. 6.

In this embodiment, the fastening member 70 is a lever member. One end of the fastening member 70 is a cam end 72. The cam end 72 is positioned in the first rotary button 50 and pivotally connected with the front end of the rod section 41 of the first threaded rod 40 by means of the insertion pin 51. The cam end 72 corresponds to the hub section 62 of the first gear 60. The other end of the fastening member 70 is positioned outside the rotary button 50 for a user to lever. The fastening member 70 can be levered and angularly displaced between a fastening position as shown in FIG. 9 and a releasing position as shown in FIG. 12. The fastening member 70 is positioned at the front end of the device 10 to facilitate operation of a user.

A housing 90 composed of a top cover 92 and a bottom cover 94 is fixedly connected with the two end pieces 20, 21 by means of threaded members.

The usage of the present invention will be described hereinafter. In use of the adjustment device 10, the two slide seats 30, 35 can be adjusted.

Figure 8:
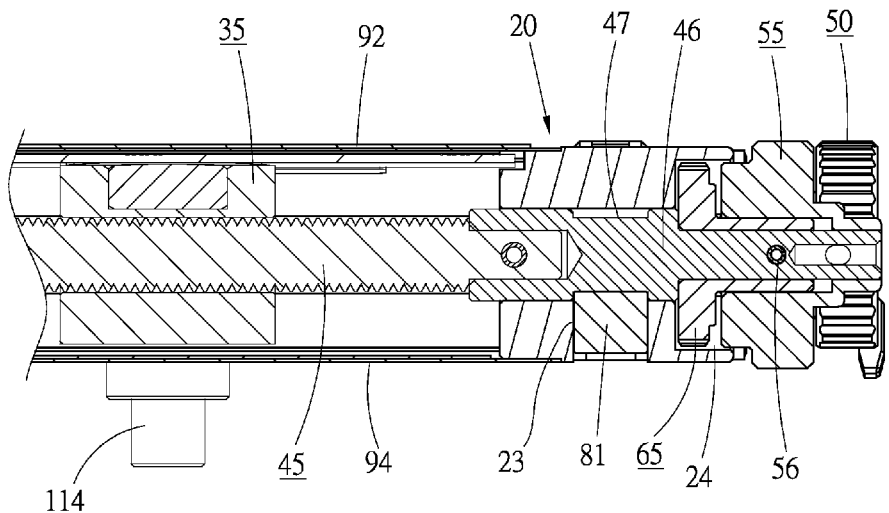
FIG. 8 is a sectional view taken along line 8-8 of FIG. 6.

FIG. 7 shows that the holding block 81 of the lock mechanism 80 is moved upward to an upper dead end and positioned in a locking position. In this case, the holding block 81 holds/clamps the rod sections 41, 46 of the two threaded rods 40, 45 as shown in FIGS. 7 to 9. Under such circumstance, the two threaded rods are fixed and hindered from being rotated so that the two slide seats 30, 40 keep located.

As shown in FIG. 10, when the lever 82 of the lock mechanism 80 is levered up, another part of the cam end 83 abuts against the front end piece 20, whereby the link 87 and the holding block 81 are moved downward to a releasing position where the holding block 81 releases the two threaded rods 40, 45. Under such circumstance, the two threaded rods can be rotated via the two rotary buttons 50, 55. When rotating the first rotary button 50, the first slide seat 30 is driven to slide. When rotating the second rotary button 55, the second slide seat 35 is driven to move.

Figure 11:
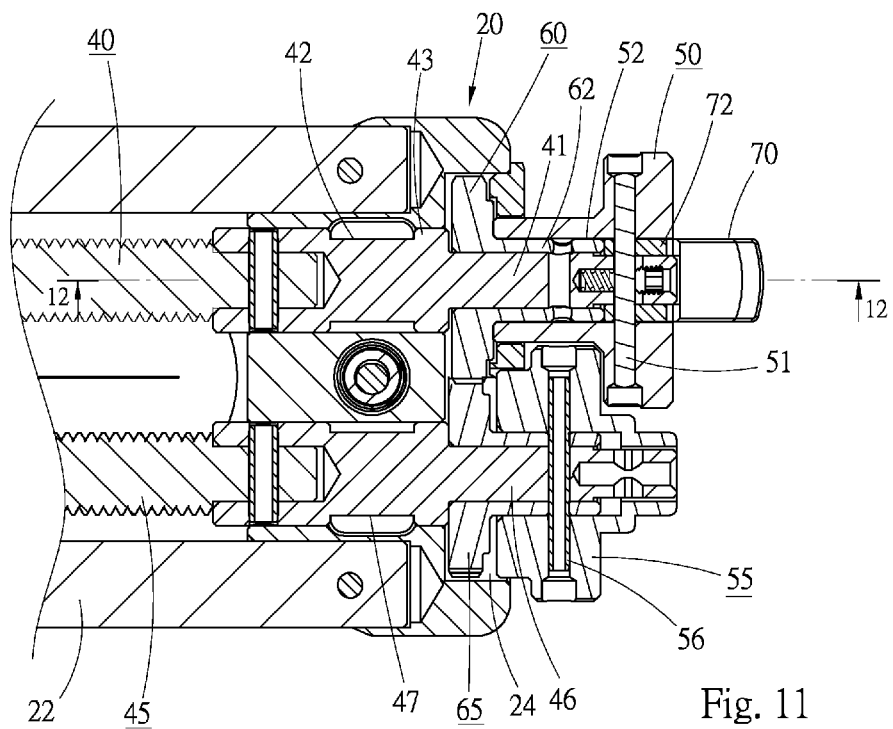
FIG. 11 is a view according to FIG. 6, showing that the fastening member is positioned in a releasing position.

The two threaded rods of the present invention can be operated in an "independent operation" mode or a "synchronous operation" mode. The two threaded rods can be switched between the independent operation mode and the synchronous operation mode by means of the fastening member 70. Referring to FIGS. 11 and 12, when the fastening member 70 is positioned in the releasing position, the fastening member 70 does not press the first gear 60 so that the gear 60 is free to rotate around the rod section 41 of the first threaded rod 40. In the releasing state, the two threaded rods are in the independent operation mode. When a user rotates the first rotary button 50 to rotate the first threaded rod 40, the first gear 60 will not rotate along with the rotary button 50 and the threaded rod 40. When the user rotates the second rotary button 55 to rotate the second threaded rod 45, the second gear 65 will rotate along with the second rotary button and the second threaded rod. In this embodiment, the two gears 60, 65 are always engaged with each other. Therefore, when the second gear 65 is rotated, the first gear 60 is driven to rotate. However, the first gear 60 simply idles around the rod section 41. Therefore, in the independent operation mode, the two threaded rods rotate independently without relationship of synchronous rotation.

Please now refer to FIGS. 6 and 9. When the fastening member 70 is levered to the fastening position, an outermost protrusion part 721 of the cam end 72 of the fastening member touches the hub section 62 of the first gear 60 to rearward push the first gear to a drivingly connected position where the first gear is tightly pressed against the shoulder section 43 of the rod section 41. Accordingly, in the fastening state, the first gear 60 is fastened between the first rotary button 50 and the shoulder section 43 of the first threaded rod 40. Under such circumstance, the first rotary button 50, the first threaded rod 40 and the first gear 60 can be synchronously rotated. In this case, when rotating the first rotary button 50, not only the first threaded rod 40 and the first gear are rotated, but also the second gear 65 is driven and rotated by the first gear to make the second threaded rod 45 synchronously rotate. Reversely, when rotating the second rotary button 55, not only the second threaded rod 45 and the second gear 65 are rotated, but also the first gear 60 is rotated by the second gear 65 to make the first threaded rod 40 synchronously rotate. Therefore, in the fastening state, the two threaded rods are in a synchronous rotation relationship, the threaded rods are driven with each other via the transmission gears and synchronously rotatable to make the two slide seats 30, 40 slide at the same time. As a result, in the synchronous operation mode, the two threaded rods rotate synchronously when any one of the threaded rods is rotated.

When switched to the independent operation mode, the fastening member 70 is levered to the releasing position as shown in FIGS. 11 and 12, where the cam end 72 no more abuts against the hub section 62 of the first gear 60. Under such circumstance, the first gear is no longer fastened to the shoulder section 43 of the first threaded rod and is restored to a free state.

In this embodiment, by means of tightly contact between the first gear 60 and the shoulder section 43 of the rod section 41, the first gear 60 can be steplessly fastened to the first threaded rod 40. That is, no matter in what angular position the threaded rod 40 and the rotary button 50 are positioned, the first gear can be fastened to the first threaded rod. In practice, the contact faces of the first gear 60 and the shoulder section 43 can be formed with engagement sections in, (but not limited to), positions A as shown in FIGS. 6 and 9. The engagement sections can be fine recessed/raised surfaces or fine teeth. In this case, when the gear 60 is moved to the drivingly connected position, the gear 60 is engaged with the engagement section of the shoulder section 43 of the first threaded rod 40 to enhance connection effect.

After the two slide seats 30, 40 are moved to a desired position, the lever 82 of the lock mechanism 80 is levered to the locking position as shown in FIG. 7, where the outermost protrusion part 831 of the cam end 83 abuts against the pad 87 to move the holding block 81 upward to the locking position where the holding block 81 holds/clamps the rod sections 41, 46 of the two threaded rod. Under such circumstance, the two slide seats are located and hindered from moving.

Please now refer to FIGS. 5 and 6. The front end of the rod section 41 of the first threaded rod 40 is formed with a threaded hole 411. An adjustment screw 401 is screwed in the threaded hole 411 in abutment with the insertion pin 51. A spring 402 is disposed in the threaded hole to abut against the insertion pin 51 from inner end of the threaded hole. By means of rotating the screw 401, the insertion pin 51 and the fastening member 70 can be moved within a radial hole 412 of the rod section 41 along the axis of the threaded rod between different positions. Accordingly, the fastening force applied by the fastening member to the first gear can be adjusted. Similarly, by means of rotating the threaded member 86 of the lock mechanism 80, the holding force applied by the holding block 81 to the two threaded rods can be adjusted.

Figure 13:
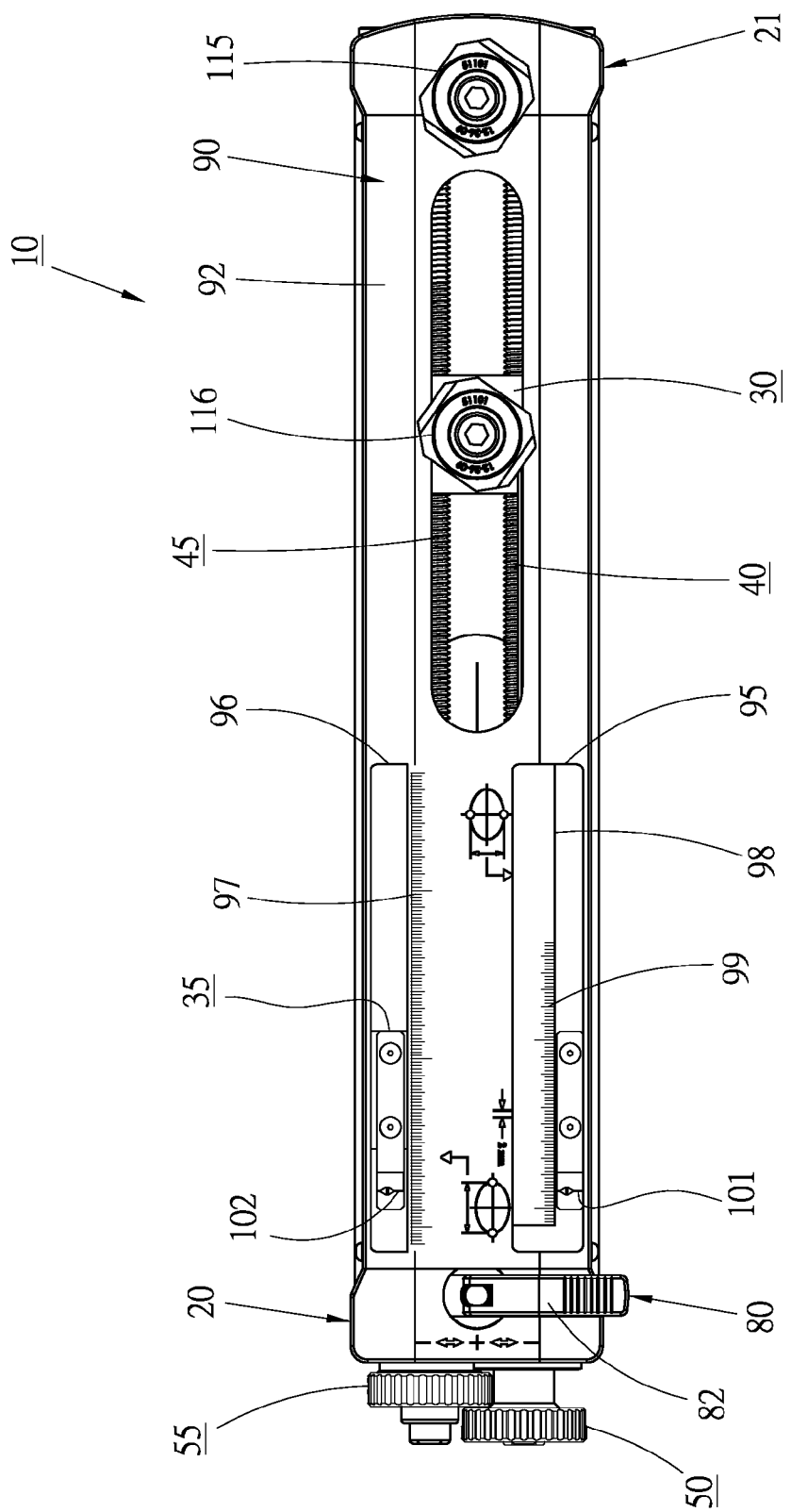
FIG. 13 is a top view of the first embodiment of the present invention.

FIGS. 14 to 18 show an application of the axial adjustment device of the present invention. The axial adjustment device is installed to an elliptically moving mechanism 120 for forming elliptical tracks. Please first refer to FIGS. 2, 3 and 13. The top cover 92 has two elongated transparent windows 95, 96. A scale 97 is disposed on one side of one of the windows. A ruler 98 with a scale 99 is fixedly disposed on the top face of the rear slide seat 30. The ruler 98 is movable along with the rear slide seat 30. Two indicators 101, 102 are disposed on the top face of the front slide seat 35 and shown to the outer side through the two windows 95, 96. The scale 99 of the ruler 98 is shown to the outer side through the window 95.

Figure 15:
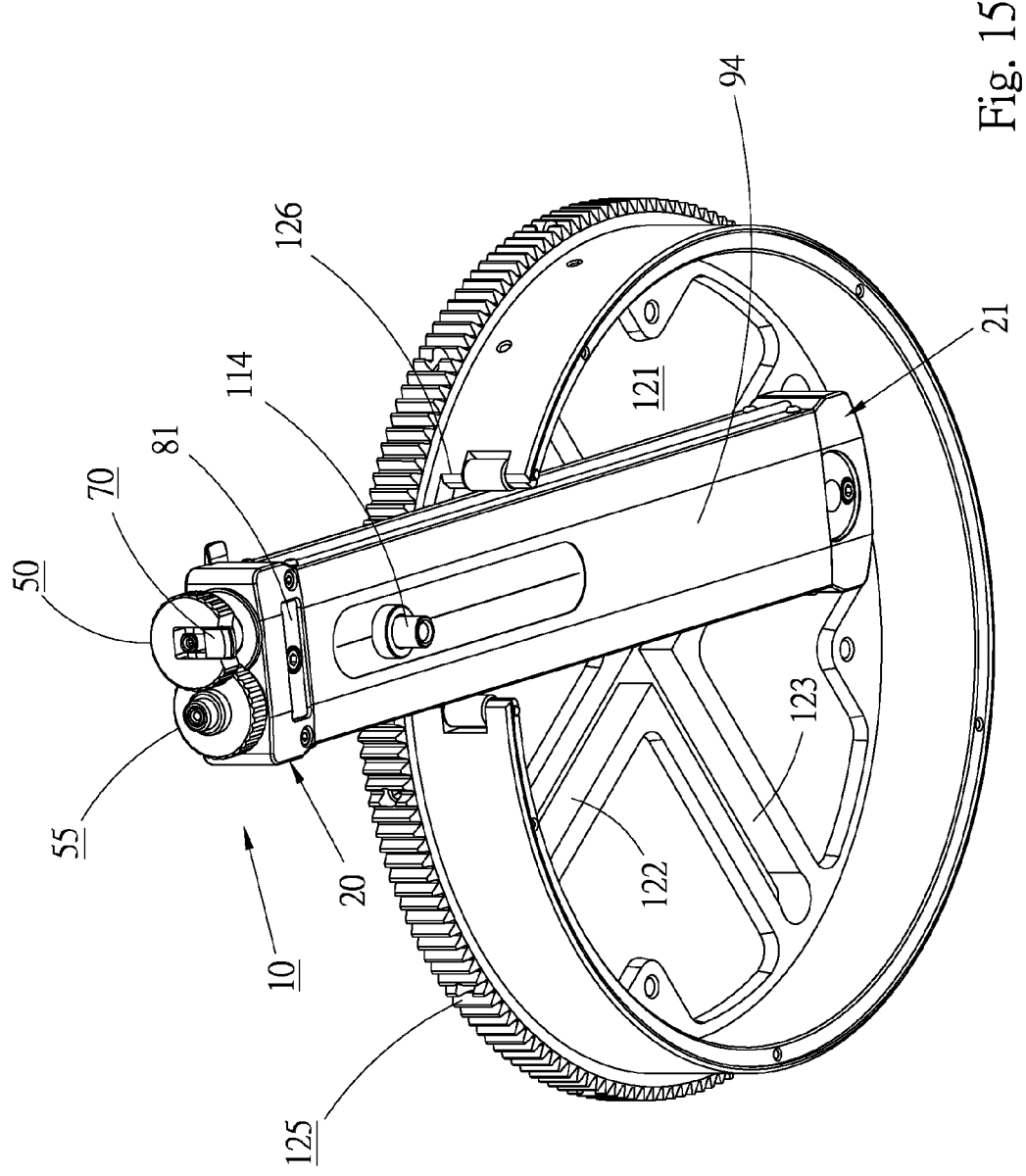

Three articles such as three rod members 110, 112, 114 are respectively disposed on the rear end piece 21, the rear slide seat 30 and the front slide seat 35. The rod member 114 disposed on the front slide seat 35 protrudes from a bottom face of the front slide seat as a tool connection section as shown in FIG. 15. Two slide members 115, 116 are respectively disposed on the rod members 110, 112 of the rear end piece and the rear slide seat.

Figure 14:
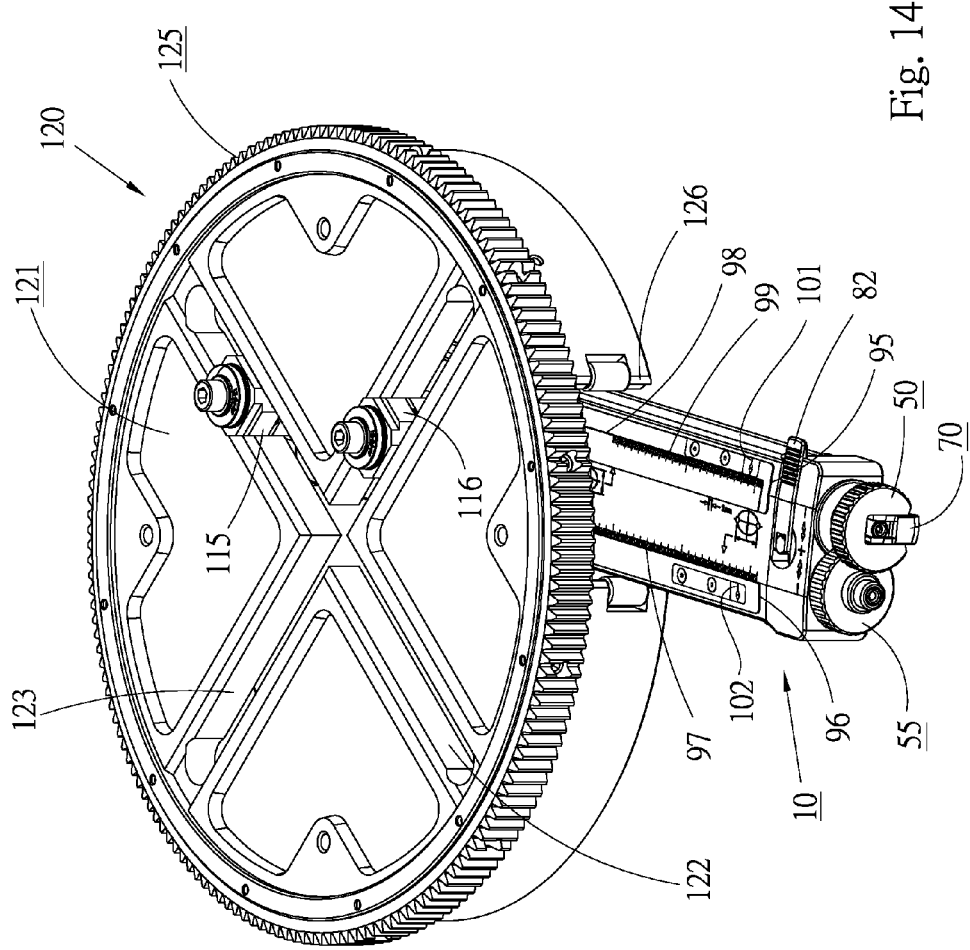
FIGS. 14 to 18 show an application of the axial adjustment device of the present invention.

Please refer to FIGS. 14 and 15. The elliptically moving mechanism 120 has a track disc 121 and a transmission ring 125. The transmission ring 125 is rotatably fitted around a circumference of the track disc 121. The adjustment device 10 serves as a rocking arm of the elliptically moving mechanism 120. The track disc 121 has two tracks 122, 123 perpendicularly intersecting each other in the form of a cross. The two slide members 115, 116 of the adjustment device 10 are slidably disposed in the tracks 122, 123 of the track disc 121. The transmission ring 125 has an opening 126. The adjustment device 10 extends through the opening 126 of the transmission ring 125 out of the transmission ring 125. The slide members and the elliptically moving mechanism are not included in the main scope of the present invention and thus will not be further described hereinafter.

Figure 16:
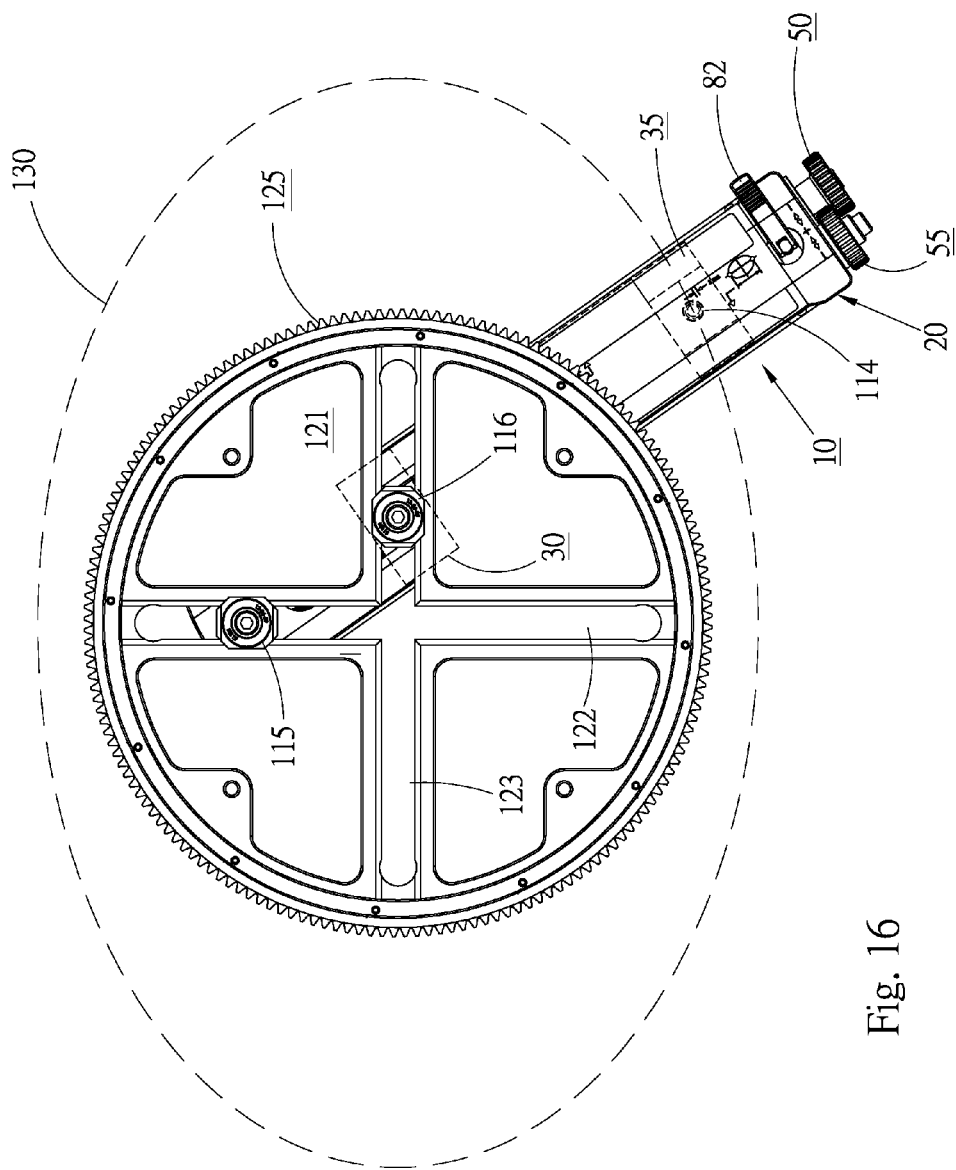

In operation of the elliptically moving mechanism 120, the transmission ring 125 is rotated around the track disc 121 to drive the axial adjustment device 10 to move. At this time, the two slide members 115, 116 are slid within the two tracks 122, 123. After the transmission ring 125 is rotated by one circle, the rod member 114 will form an elliptical track 130 as shown in FIG. 16.

Figure 17:
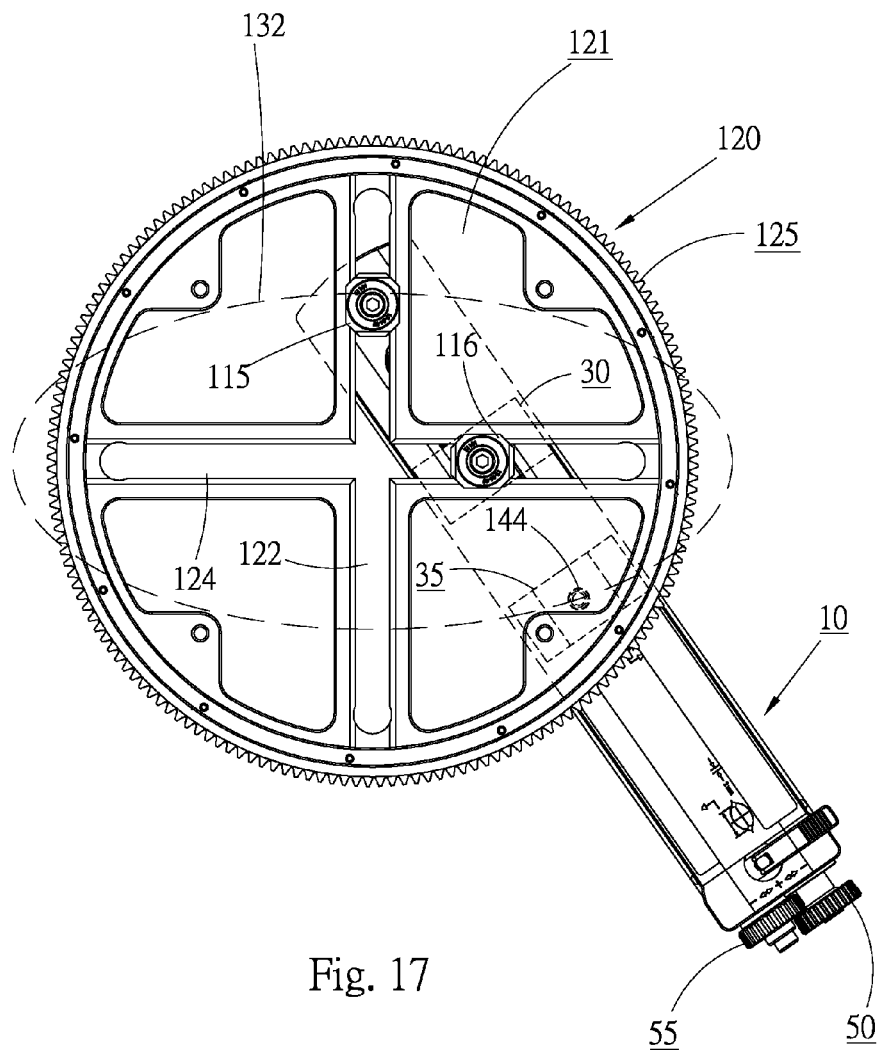

A user can rotate the second rotary button 55 to drive and slide the front slide seat 35 so as to change the distance between the rod member 114 and the first slide member 115 for adjusting the size of the long axis of the elliptical track. When rotating the first rotary button 50, the rear slide seat 30 is driven to move so as to change the distance between the second slide member 116 and the rod member 114 for adjusting the size of the short axis of the elliptical track. Accordingly, by means of adjusting the lengths of the long axis and short axis of the elliptical track, different sizes of elliptical tracks can be formed. FIG. 17 shows that the rod member 114 of the adjustment device 10 forms a smaller elliptical track 132. The lengths of the long axis and short axis of the elliptical track can be known from the scales 97, 99 and the indicators 101, 102 on the top face of the device 10.

When the adjustment device 10 is in the synchronous operation mode, a user can rotate any of the rotary buttons 50, 52 to simultaneously drive the two slide seats 30, 35 to slide. Accordingly, the user can conveniently adjust the lengths of the long axis and short axis of the elliptical track at the same time to form different elliptical tracks with different sizes but equal proportion.

Figure 18:
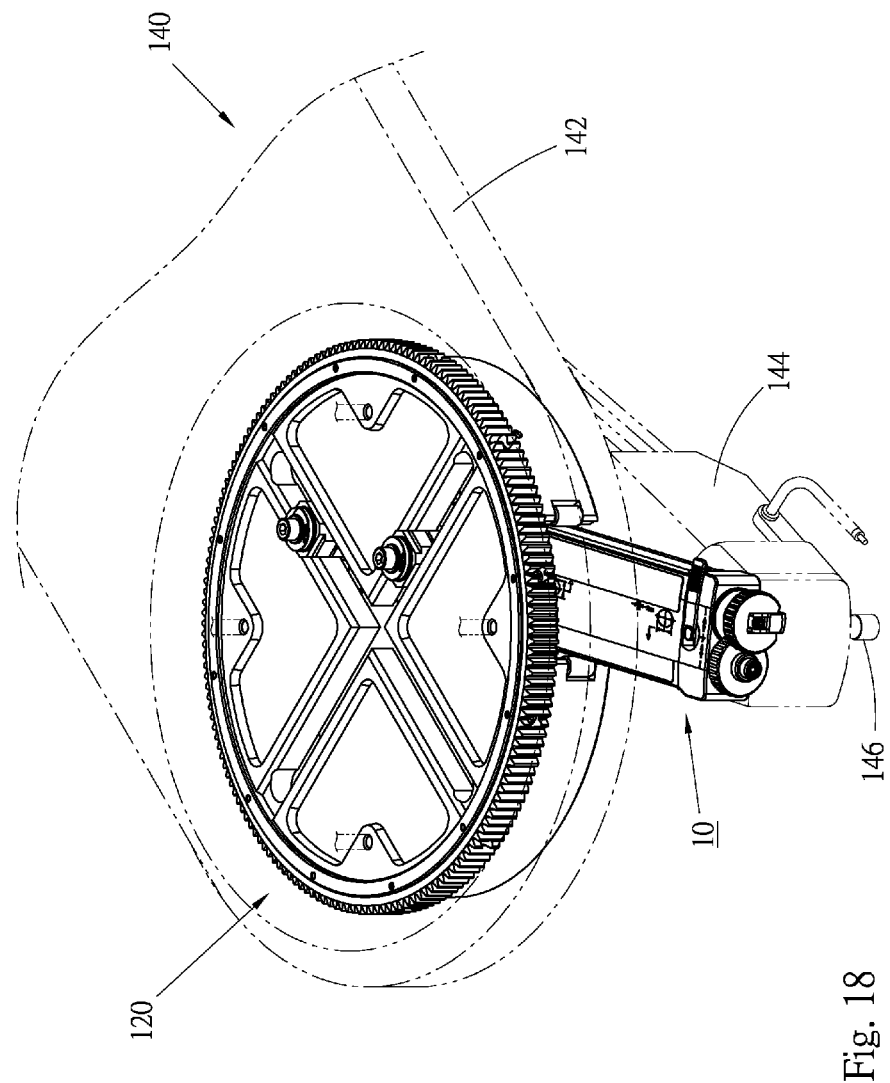

Please now refer to FIG. 18. The elliptically moving mechanism 120 is installable to a cantilever 142 of a cutting apparatus 140. A tool 144 (such as a cutting tool) is connected to the rod member 114 of the adjustment device 10. In this case, the cutter 146 of the cutting tool 144 can cut an oval hole on a work piece.

The application of the adjustment device of the present invention is not limited to the above application. The adjustment device of the present invention is also applicable to other apparatus necessitating axial adjustment. The scales and indicators of the adjustment device also are not limited to the above embodiment. Moreover, in the case that it is unnecessary to locate the slide seats, the lock mechanism is omissible.

Figure 19:
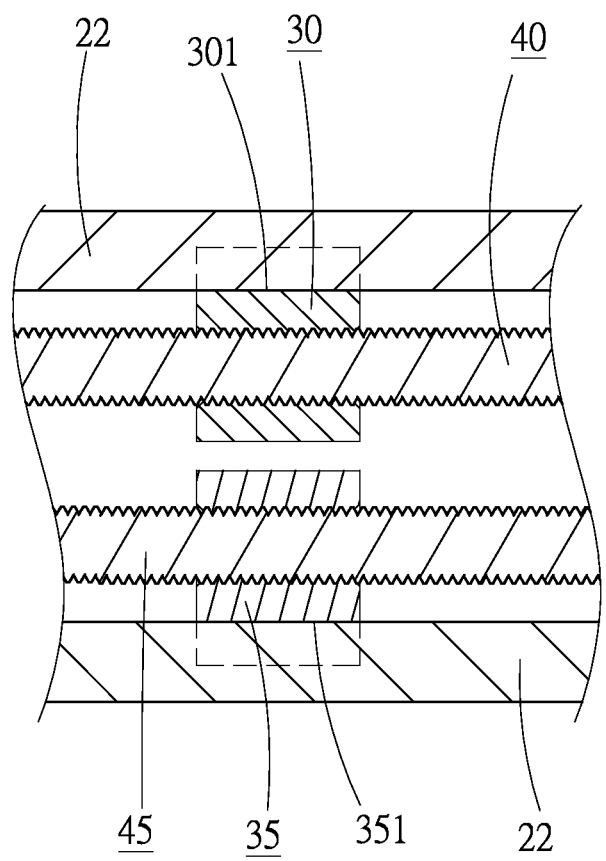
FIG. 19 is a sectional view of a part of a second embodiment of the present invention.

FIG. 19 is a partially sectional view showing a second embodiment of the axial adjustment device of the present invention. Apart (not shown) of the second embodiment is identical to that of the first embodiment. The second embodiment is different from the first embodiment in that the first threaded rod 40 is only screwed in the first slide seat 30 without being passed through the second slide seat 35, while the second threaded rod 45 is only screwed in the second slide seat 35 without being passed through the first slide seat 30. According to such arrangement, the two threaded rods can also drive the two slide seats to axially slide along the threaded rods.

The axial adjustment device of the present invention can control the displacement of two objects and adjust the distance between the two objects. Furthermore, the axial adjustment device of the present invention can be operated in the independent operation mode or the synchronous operation mode for independently or synchronously moving the two objects. The axial adjustment device of the present invention can be easily switched between the independent operation mode and the synchronous operation mode and conveniently used.

The above embodiments are only used to illustrate the present invention, not intended to limit the scope thereof. Many modifications of the above embodiments can be made without departing from the spirit of the present invention.

What is claimed is:

1. An axial adjustment device comprising:
a main body having a front end piece formed at a front end of the main body;
a first slide seat and a second slide seat disposed in the main body;
a first threaded rod and a second threaded rod disposed in the main body, each of the two threaded rods having a front end provided with a rod section, the rod sections extending through the front end piece; a body of the first threaded rod being screwed in the first slide seat for driving the first slide seat to axially move along the first threaded rod; a body of the second threaded rod being screwed in the second slide seat for driving the second slide seat to axially move along the second threaded rod;
a first rotary button and a second rotary button, the first rotary button being disposed at a front end of the rod section of the first threaded rod, the second rotary button being located on the front end piece for driving the second threaded rod;
a first transmission gear and a second transmission gear, the second transmission gear being fixedly connected to the rod section of the second threaded rod; the first transmission gear being selectively connected with the rod section of the first threaded rod; and
a fastening member located on a front end of the axial adjustment device and mounted between the rod section of the first threaded rod and the first rotary button, the fastening member being movable between a fastening position and a releasing position, when the fastening member is positioned in the fastening position, the two threaded rods being driven with each other via the two transmission gears, and the first threaded rod and the first rotary button rotating with the first transmission gear; when the fastening member is positioned in the releasing position, the first threaded rod and the first rotary button rotating independently of the first transmission gear, the second transmission gear and the second threaded rod.

2. The axial adjustment device as claimed in claim 1, wherein the fastening member is disposed between the first threaded rod and the first transmission gear; the first transmission gear being engaged with the second transmission gear; when the fastening member is positioned in the fastening position, the first transmission gear being fastened to the first threaded rod, and the first transmission gear and the first threaded rod are synchronously rotated; when the fastening member is positioned in the releasing position, the first transmission gear being released from the first threaded rod, and the first transmission gear being freely rotatable around the rod section of the first threaded rod.

3. The axial adjustment device as claimed in claim 2, wherein the first rotary button has an internal passage and the gear has a hub section protruding from a front end of the first gear, the hub section extending into the passage of the first rotary button; one end of the fastening member being a cam end, the cam end being pivotally connected with a front end of the rod section of the first threaded rod, when the fastening member is positioned in the fastening position, the cam end pushing the hub section of the first gear.

4. The axial adjustment device as claimed in claim 2, wherein the rod section of the first threaded rod has a shoulder section positioned adjacent to the first gear; when the fastening member is located in the fastening position, the fastening member pushing the first transmission gear to fasten the first transmission gear to the shoulder section of the first threaded rod.

5. The axial adjustment device as claimed in claim 4, wherein the first rotary button has an internal passage and the gear has a hub section protruding from a front end of the first gear, the hub section extending into the passage of the first rotary button; one end of the fastening member being a cam end, the cam end being pivotally connected with a front end of the rod section of the first threaded rod, when the fastening member is positioned in the fastening position, the cam end pushing the hub section of the first gear.

6. The axial adjustment device as claimed in claim 1, wherein the first transmission gear is freely rotatable and slidable on the rod section of the first threaded rod and is always engaged with the second transmission gear, contact faces of the first transmission gear and the first threaded rod being formed with engagement sections; when the fastening member is positioned in the fastening position, the engagement sections being in contact with each other, whereby the first transmission gear and the first threaded rod can be synchronously rotated; when the fastening member is positioned in the releasing position, the engagement sections of the first transmission gear and the first threaded rod being separated from each other.

7. The axial adjustment device as claimed in claim 1, further comprising a lock mechanism disposed in the front end piece, the lock mechanism serving to hold or release the rod sections of the two threaded rods.

8. The axial adjustment device as claimed in claim 7, wherein the lock mechanism includes a holding block movable between a locking position and an unlocking position, when the holding block is positioned in the locking position, the holding block holding the rod sections of the two threaded rods.

9. The axial adjustment device as claimed in claim 8, wherein one face of the front end piece is formed with a recess; each rod section of the two threaded rods is formed with an annular groove; the rod sections of the threaded rods pass through the recess and the annular grooves are positioned in the recess; the holding block is disposed in the recess, one end of the holding block is in the annular grooves.

10. The axial adjustment device as claimed in claim 8, wherein a first face of the front end piece is formed with a recess; the rod sections of the two threaded rods passing through the recess; the holding block being positioned in the recess and slidable within the recess; the lock mechanism further including a lever and a link, the lever being positioned on a second face of the front end piece; the link extending through the front end piece, two ends of the link being respectively connected with the lever and the holding block; when levering the lever, the holding block being driven to move between the locking position and the unlocking position.

11. The axial adjustment device as claimed in claim 10, wherein the recess is formed on the first face of the front end piece; a connection hole communicates with the recess and the second face of the front end piece; the link extends through the connection hole; the lock mechanism further including an elastic member, two ends of the elastic member respectively abutting against the front end piece and the holding block, the elastic member serving to apply an elastic force to the holding block for making the holding block slide downward; when levering the lever, the holding block being driven to move toward and away from the second face of the front end piece.

12. The axial adjustment device as claimed in claim 1, further comprising a housing disposed on the outer side of the main body, one wall face of the housing being provided with at least one window and a scale.

13. The axial adjustment device as claimed in claim 1, further comprising a housing disposed on the outer side of the main body, one wall face of the housing being provided with at least one window; at least one scaled ruler being connected with the first slide seat or the second slide seat and slidable with the slide seat, the scaled ruler being shown to outer side through the window.

14. The axial adjustment device as claimed in claim 1, wherein the front end face of the front end piece is formed with a chamber; front ends of the threaded rods pass through the chamber; the transmission gears are mounted in the chamber.

15. An axial adjustment device comprising:
a front end piece and a rear end piece;
a first slide seat and a second slide seat disposed between the two end pieces;
a first threaded rod and a second threaded rod disposed between the two end pieces, each of the two threaded rods having a front end provided with a rod section, the rod sections extending through the front end piece and out of the front end piece; a body of the first threaded rod being screwed in the first slide seat; a body of the second threaded rod being screwed in the second slide seat;
a first rotary button and a second rotary button, the first rotary button being disposed at a front end of the rod section of the first threaded rod, the second rotary button being located on the front end piece for driving the second threaded rod;
a first transmission gear and a second transmission gear, the second transmission gear being fixedly disposed on the rod section of the second threaded rod;
the first transmission gear being disposed on the rod section of the first threaded rod and freely rotatable on the rod section of the first threaded rod and always engaged with the second transmission gear;
a fastening member disposed between the first threaded rod and the first gear and movable between a fastening position and a releasing position, when the fastening member is positioned in the fastening position, the first transmission gear being fastened to the first threaded rod by the fastening member, whereby the first transmission gear and the first threaded rod are synchronously rotatable and the two threaded rods are driven with each other via the two transmission gears; when the fastening member is positioned in the releasing position, the fastening member releasing the first transmission gear from the first threaded rod; and
a lock mechanism disposed in the front end piece, the lock mechanism serving to hold or release the two threaded rods.

16. The axial adjustment device as claimed in claim 15, wherein the rod section of the first threaded rod has a shoulder section; the fastening member serving to push the first gear to fasten the first gear to the shoulder section.

17. The axial adjustment device as claimed in claim 15, wherein one face of the front end piece is formed with a recess, the rod sections of the two threaded rods passing through the recess, the lock mechanism including a holding block, a lever and a link, the holding block being positioned in the recess and slidable within the recess, the lever being positioned on another face of the front end piece, the link extending into the front end piece, two ends of the link being respectively connected with the lever and the holding block, when levering the lever, the holding block being driven to move between a locking position and an unlocking position, when the holding block is positioned in the locking position, the holding block holding the rod sections of the two threaded rods.

18. The axial adjustment device as claimed in claim 15, further comprising a housing disposed between the front and rear end pieces; each of the two slide seats and/or the rear end piece being connected with an article.

19. The axial adjustment device as claimed in claim 15, further comprising a housing disposed between the front and rear end pieces, one wall face of the housing being provided with at least one window; at least one scaled ruler being connected with the first slide seat or the second slide seat and slidable with the slide seat, the scaled ruler being shown to outer side through the window.

20. The axial adjustment device as claimed in claim 15, wherein the slide seats are forward and backward arranged;

the body of the firs threaded rod is passed through the second slide seat and the body of the second threaded rod is passed through the first slide seat.

\* \* \* \* \*